Dec. 17, 1957      R. L. SCHWING      2,817,068
CLIP
Filed Sept. 13, 1956
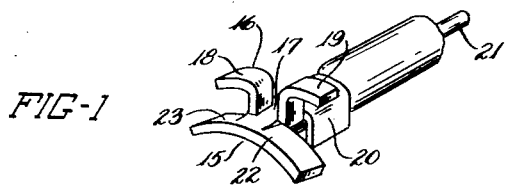
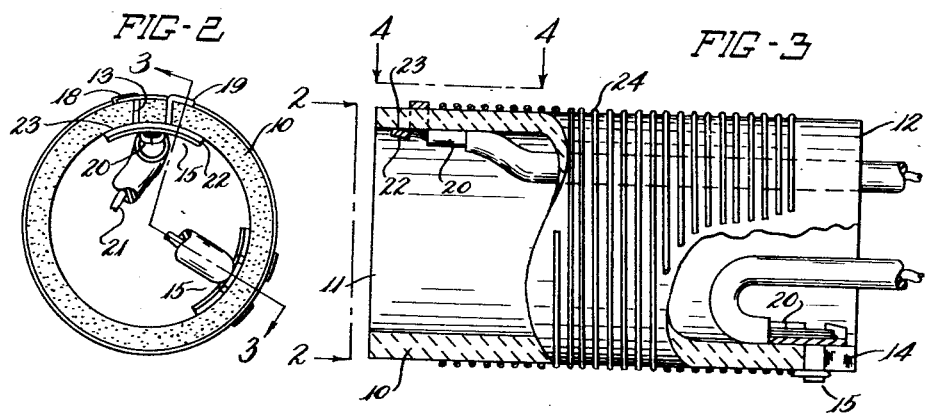
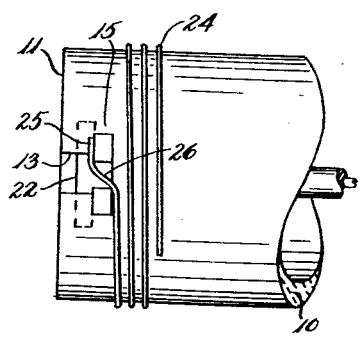
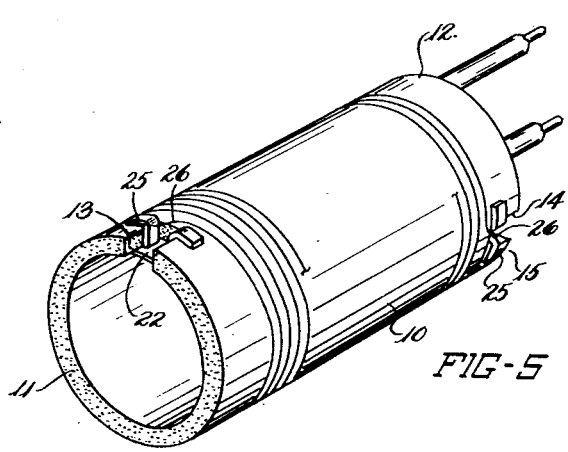
INVENTOR.
RUSSELL L. SCHWING
BY Oldham & Oldham
ATTYS.

United States Patent Office 2,817,068
Patented Dec. 17, 1957

2,817,068
CLIP

Russell L. Schwing, Akron, Ohio, assignor to Thermal Mfg. Company, Akron, Ohio, a corporation of Ohio Application September 13, 1956, Serial No. 609,595

10 Claims. (Cl. 339—221)

This invention relates to a clip for securing an end of a coil winding to a tubular core and for connecting a wire lead thereto. The invention may be used wherever an anchor clip is required to anchor a winding to a tubular core, but is especially useful where the tubular core is of ceramic or other vitrous material. The invention is particularly useful in the manufacture of electrical heating units.

In the manufacture of heating coils, inductances and other electrical apparatus where coils are to be wound about cores, it has been a problem to properly anchor the ends of the coils to secure them to lead wires especially where the cores are of fragile material.

The present invention provides a clip which may be applied axially of the core to an open ended slot provided in the core, and one which will frictionally grip the wall of the core against removal along the slot.

It is an object of the invention to securely anchor the ends of the coil to the core and to provide an anchorage for the wire leads.

Other objects are to provide a clip which will resist high temperatures and corrosion, to provide a clip to which a coiled resistance wire may be readily secured by welding, and one which will be retained on a ceramic core and may be applied thereto with a minimum amount of core breakage.

These and other objects will appear from the following description and the accompanying drawings.

Fig. 1 is a perspective view of the clip of the invention attached to a wire lead;

Fig. 2 is an end view of a tubular core having clips of the invention secured at opposite ends thereof, a pair of wire leads secured thereto and a coil of wire about said core with its ends secured to the clips, taken on plane 2—2 of Fig. 3;

Fig. 3 is a side view of the assembly of Fig. 2 partly broken away and partly in section along line 3—3 of Fig. 2;

Fig. 4 is a detail side view of the assembly of Figs. 2 and 3 partly broken away; and Fig. 5 is a perspective view of the assembly of Figs. 2, 3 and 4.

Referring to the drawings, the tubular core 10 is of ceramic material of cylindrical shape having squared ends 11 and 12. Open-ended slots 13, 14 extend axially of the core at opposite ends thereof to receive the anchor clips.

Each anchor clip 15 comprises a unitary sheet metal body comprising a yoke portion 16 having a U-shaped loop 17 for entering and extending through the slot 13 with oppositely projecting wings 18, 19 for engaging over the outer face of the core adjacent the slot. The clip also has an oppositely turned wire-engaging portion 20 of U-shape adapted to be crimped about a lead wire 21. The wire engaging portion is preferably positioned adjacent the yoke portion at one side thereof axially of the core with the centers of their loops joined in the same plane.

Formed integrally with the yoke is a clamp bar portion 22 having its center adjacent to and joined to the yoke portion at the bottom of the loop of the yoke in position to extend across the slot of the core to bear against the inner face of the core adjacent the slot. As will be seen, especially in Fig. 3, the clamp bar is offset axially of the core from the yoke portion 16 in the direction of the open end of the slot and due to this arrangement, the plane of clamping pressure is inclined relative to the direction of the axis of the core in a direction to increase frictional resistance to removal in a direction axially of the core. Further resistance to removal of the clip axially of the slot is provided by torsionally deforming the clamp bar by twisting its end through an angle of twenty degrees to present sharp core engaging edges 23 spaced from the yoke axially of the core toward the open end of the slot. With this construction, the sharp edges may bite into the core to resist removal.

The clip is preferably made of strong sheet metal having resistance to distortion and of spring-like character. Also, the clip is preferably of corrosion-resistant metal having good resistance to bending even when heated, especially where the coil is a heating coil. I have found that a corrosion-resistant metal known as Inconel and containing approximately 80% nickel, 14% chromium and 6% iron is very satisfactory for the purpose. Such metal may be electrically welded to the resistance wire coil 24 as at 25, the wire being of Nichrome metal of 80% nickel and 20% chromium. It has been determined that any of the nickel-chrome alloys may be welded in this manner.

In the manufacture of a heating unit of this type employing the clip of this invention, the clip is so formed that the distance between the wings 18, 19 of the yoke and the clamp bar 22 is slightly greater than the wall thickness of the tubular core, the clip clamp bar being sprung slightly due to its torsional deformation while passing inside the tubular wall and being held against removal by the friction of the sharp edges of the clamp bar against the inner core surface. The lead wires, which are preferably of stranded nickel asbestos covered wire, are secured to the clips before the clips are inserted and may be welded or mechanically crimped to the clips to provide a continuous circuit with the clips and the coil. Attachment of the resistance wire 24 to clip 15 is by welding at 25 with weld strain relief provided for, and due to, the reverse bend 26 of the wire around the opposite wing.

While the clips have been described and shown, for purposes of illustrating the invention, as employed in securing a resistance element and a lead wire to a tubular core of insulation, it will be apparent that the clip may be employed to secure such element to a non-tubular core or support such as to a flat sheet of insulating material having an open slot.

These and other variations may be made without departing from the scope of the invention as it is defined by the following claims.

I claim:

1. A clip for securing an end of a coil winding to a tubular core and for connecting a wire lead thereto, said clip comprising a yoke portion having a U-shaped loop for entering an open-ended slot through the wall of a tubular core with oppositely projecting wings for engaging over the outer face of the core adjacent the slot, an oppositely turned wire-engaging portion of U-shape adapted to be crimped about a lead wire at a position within said tubular core, and a clamp bar portion secured at its center to the center of said U-shaped loop of the yoke portion for frictionally engaging the inner face of the core adjacent the slot, said clip being adapted to be engaged over the wall of the core about the slot under tension of said clamp bar.

2. A clip for securing an end of a coil winding to a tubular core and for connecting a wire lead thereto, said clip comprising a yoke portion having a U-shaped loop for entering an open-ended slot through the wall of a tubular core with oppositely projecting wings for engaging over the outer face of the core adjacent the slot, an oppositely turned wire-engaging portion of U-shape adapted to be crimped about a lead wire at a position within said tubular core, and a clamp bar portion secured at its center to the center of said U-shaped loop of the yoke portion for frictionally engaging the inner face of the core adjacent the slot, said clip being adapted to be engaged over the wall of the core about the slot under tension of said clamp bar, said clamp bar being offset axially of the tubular core from and adjacent to said yoke portion in the direction of the open-end of the slot so that the plane of clamping pressure is inclined relative to the direction of the axis of the core in a direction to increase frictional resistance to removal in a direction axially of the core.

3. A clip for securing an end of a coil winding to a tubular core and for connecting a wire lead thereto, said clip comprising a yoke portion having a U-shaped loop for entering an open-ended slot through the wall of a tubular core with oppositely projecting wings for engaging over the outer face of the core adjacent the slot, an oppositely turned wire-engaging portion of U-shape adapted to be crimped about a lead wire at a position within said tubular core, and a clamp bar portion secured at its center to the center of said U-shaped loop of the yoke portion for frictionally engaging the inner face of the core adjacent the slot, said clip being adapted to be engaged over the wall of the core about the slot under tension of said clamp bar, said clamp bar being offset axially of the tubular core from and adjacent to said yoke portion in the direction of the open end of the slot and the ends of said bar being torsionally deformed to present sharp core engaging edges spaced from said yoke in a direction axially of the core toward the open end of the slot so that the plane of clamping pressure is inclined relative to the direction of the axis of the core in a direction to increase frictional resistance to removal in a direction axially of the core.

4. A clip for securing an end of a coil winding to a tubular core and for connecting a wire lead thereto, said clip comprising a yoke portion having a U-shaped loop for entering an open-ended slot through the wall of a tubular core with oppositely projecting wings for engaging over the outer face of the core adjacent the slot, an oppositely turned wire-engaging portion of U-shape adapted to be crimped about a lead wire at a position within said tubular core, and a clamp bar portion secured at its center to the center of said U-shaped loop of the yoke portion for frictionally engaging the inner face of the core adjacent the slot, said clip being adapted to be engaged over the wall of the core about the slot under tension of said clamp bar, said clip being of soft tempered corrosion-resisting metal.

5. A clip for securing an end of a coil winding to a tubular core and for connecting a wire lead thereto, said clip comprising a yoke portion having a U-shaped loop for entering an open-ended slot through the wall of a tubular core with oppositely projecting wings for engaging over the outer face of the core adjacent the slot, an oppositely turned wire-engaging portion of U-shape adapted to be crimped about a lead wire at a position within said tubular core, and a clamp bar portion secured at its center to the center of said U-shaped loop of the yoke portion for frictionally engaging the inner face of the core adjacent the slot, said clip being adapted to be engaged over the wall of the core about the slot under tension of said clamp bar, said clip being of soft tempered nickel chromium iron alloy.

6. A clip for securing an end of a coil winding to a tubular core and for connecting a wire lead thereto, said clip comprising a yoke portion having a U-shaped loop for entering an open-ended slot through the wall of a tubular core with oppositely projecting wings for engaging over the outer face of the core adjacent the slot, an oppositely turned wire-engaging portion of U-shape adapted to be crimped about a lead wire at a position within said tubular core, and a clamp bar portion secured at its center to the center of said U-shaped loop of the yoke portion for frictionally engaging the inner face of the core adjacent the slot, said clip being adapted to be engaged over the wall of the core about the slot under tension of said clamp bar, said clamp bar being offset axially of the tubular core from and adjacent to said yoke portion in the direction of the open-end of the slot so that the plane of clamping pressure is inclined relative to the direction of the axis of the core in a direction to increase frictional resistance to removal in a direction axially of the core, said clip being of soft tempered corrosion-resisting metal.

7. A clip for securing an end of a coil winding to a tubular core and for connecting a wire lead thereto, said clip comprising a yoke portion having a U-shaped loop for entering an open-ended slot through the wall of a tubular core with oppositely projecting wings for engaging over the outer face of the core adjacent the slot, an oppositely turned wire-engaging portion of U-shape adapted to be crimped about a lead wire at a position within said tubular core, and a clamp bar portion secured at its center to the center of said U-shaped loop of the yoke portion for frictionally engaging the inner face of the core adjacent the slot, said clip being adapted to be engaged over the wall of the core about the slot under tension of said clamp bar, said clamp bar being offset axially of the tubular core from and adjacent to said yoke portion in the direction of the open-end of the slot so that the plane of clamping pressure is inclined relative to the direction of the axis of the core in a direction to increase frictional resistance to removal in a direction axially of the core, said clip being of soft tempered nickel chromium iron alloy.

8. A clip for securing an end of a coil winding to a tubular core and for connecting a wire lead thereto, said clip comprising a yoke portion having a U-shaped loop for entering an open-ended slot through the wall of a tubular core with oppositely projecting wings for engaging over the outer face of the core adjacent the slot, an oppositely turned wire-engaging portion of U-shape adapted to be crimped about a lead wire at a position within said tubular core, and a clamp bar portion secured at its center to the center of said U-shaped loop of the yoke portion for frictionally engaging the inner face of the core adjacent the slot, said clip being adapted to be engaged over the wall of the core about the slot under tension of said clamp bar, said clamp bar being offset axially of the tubular core from and adjacent to said yoke portion in the direction of the open end of the slot and the ends of said bar being torsionally deformed to present sharp core engaging edges spaced from said yoke in a direction axially of the core toward the open end of the slot so that the plane of clamping pressure is inclined relative to the direction of the axis of the core in a direction to increase frictional resistance to removal in a direction axially of the core, said clip being of soft tempered corrosion-resisting metal.

9. A clip for securing an end of a coil winding to a tubular core and for connecting a wire lead thereto, said clip comprising a yoke portion having a U-shaped loop for entering an open-ended slot through the wall of a tubular core with oppositely projecting wings for engaging over the outer face of the core adjacent the slot, an oppositely turned wire-engaging portion of U-shape adapted to be crimped about a lead wire at a position within said tubular core, and a clamp bar portion secured at its center to the center of said U-shaped loop of the yoke portion for frictionally engaging the inner face of the core adjacent the slot, said clip being adapted to be engaged over the wall of the core about the slot under tension of said clamp bar, said clamp bar being offset axially of the tubular core from and adjacent to said yoke portion in the direction of the open end of the slot and the ends of said bar being torsionally deformed to present sharp core engaging edges spaced from said yoke in a direction axially of the core toward the open end of the slot so that the plane of clamping pressure is inclined relative to the direction of the axis of the core in a direction to increase frictional resistance to removal in a direction axially of the core, said clip being of soft tempered nickel chromium iron alloy.

10. A clip for securing an end of a wire heating element to an insulating support and for connecting a wire lead to said heating element, said clip comprising a yoke portion having a U-shaped loop for entering an open-ended slot through the wall of said support with oppositely projecting wings for engaging over one surface of the support adjacent the slot, an oppositely turned wire-engaging portion of U-shape, adapted to be crimped about a lead wire at the opposite surface of said support, and a clamp bar portion secured at its center to the center of said U-shaped loop of the yoke portion for frictionally engaging the face of the support adjacent the slot, said clip being adapted to be engaged over said support about said slot under tension of said clamp bar.

References Cited in the file of this patent
UNITED STATES PATENTS

| | | |
|---|---|---|
| 1,759,184 | Bullinger | May 20, 1930 |
| 1,830,084 | Bjorndal | Nov. 3, 1931 |